(12) United States Patent
Patrick

(10) Patent No.: US 7,461,786 B2
(45) Date of Patent: Dec. 9, 2008

(54) SYSTEM AND METHOD FOR DETERMINING PACKAGING PREFERENCE

(75) Inventor: Kyle N. Patrick, British Columbia (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/140,819

(22) Filed: Jun. 17, 2008

(65) Prior Publication Data

US 2008/0245853 A1 Oct. 9, 2008

Related U.S. Application Data

(63) Continuation of application No. 11/490,412, filed on Jul. 20, 2006, now Pat. No. 7,407,089.

(30) Foreign Application Priority Data

Aug. 24, 2005 (CA) .................................. 2517060

(51) Int. Cl.
*G06K 15/00* (2006.01)
(52) U.S. Cl. ........................................ 235/383; 235/380
(58) Field of Classification Search ................. 235/375, 235/380, 383
See application file for complete search history.

(56) References Cited

U.S. PATENT DOCUMENTS

| | | | | |
|---|---|---|---|---|
| 6,098,879 A | * | 8/2000 | Terranova | 235/384 |
| 6,101,477 A | * | 8/2000 | Hohle et al. | 705/1 |
| 6,129,274 A | * | 10/2000 | Suzuki | 235/381 |
| 6,869,013 B2 | * | 3/2005 | Allen et al. | 235/381 |
| 7,194,422 B1 | * | 3/2007 | St. John Killick | 705/14 |
| 2005/0033688 A1 | * | 2/2005 | Peart et al. | 705/39 |
| 2005/0045718 A1 | * | 3/2005 | Bortolin et al. | 235/383 |
| 2005/0284928 A1 | * | 12/2005 | Harrell | 235/380 |
| 2006/0027662 A1 | * | 2/2006 | Baradi | 235/469 |
| 2006/0187058 A1 | * | 8/2006 | Regard | 340/572.8 |
| 2006/0229951 A1 | * | 10/2006 | Abels et al. | 705/26 |

* cited by examiner

*Primary Examiner*—Michael G. Lee
*Assistant Examiner*—Paultep Savusdiphol
(74) *Attorney, Agent, or Firm*—Pastel Law Firm; Christopher R. Pastel

(57) ABSTRACT

There is disclosed a method and system for determining packaging preference of a customer by identifying the customer using a customer identifier, and retrieving available packaging preference information using the customer identifier. In an embodiment, the customer's packaging preference information for a particular identified item is retrieved and graphically communicated. In another embodiment, customer packaging preference information based on a quantity of items is retrieved and graphically communicated. Customer packaging preference information based on both the identified items and the quantity of items may also be retrieved and graphically communicated.

17 Claims, 8 Drawing Sheets

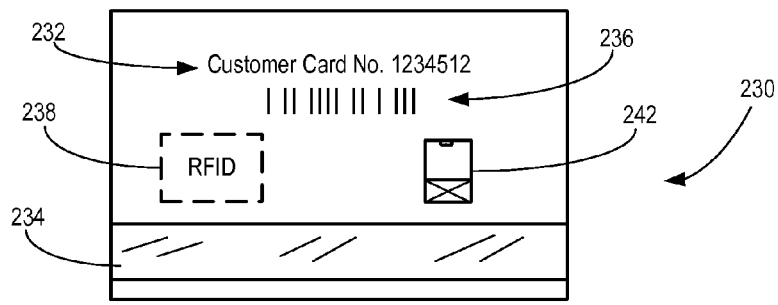

FIG. 2B

Products Table (250)

| UPC | Description | Unit Price | Image |
|---|---|---|---|
| xxxxx xxxxx 00001 | Brand X Canned Tuna | $1.99 | Brand_x_canned_tuna.jpg |
| xxxxx xxxxx 00002 | Store Brand Ground Beef | $4.95/kg | Store_brand_ground_beef.jpg |
| ... | ... | ... | ... |

Customer Information Table (252)

| Customer Card No. | Customer Name | Default Packaging Preference |
|---|---|---|
| 1234512 | Mr. Joe Smith | Recyclable paper bag |
| ... | ... | ... |

Packaging Preferences Table (254)

| Customer Card No. | UPC | Packaging Preference |
|---|---|---|
| 1234512 | xxxxx xxxxx 00001 | Recyclable paper bag |
| 1234512 | xxxxx xxxxx 00002 | Recyclable plastic bag x 2 |
| ... | ... | ... |

Packaging Types Table (256)

| Packaging Type | Image |
|---|---|
| Recyclable paper bag | Recyclable_paper_bag.jpg |
| Recyclable plastic bag | Recyclable_plastic_bag.jpg |
| Recyclable plastic bag x 2 | Recyclable_plastic_bag_x2.jpg |
| ... | ... |

FIG. 2C

Products Table (260)

| UPC | Description | Unit Price | Image |
|---|---|---|---|
| xxxxx xxxxx 00004 | Brand Y White Wine 750mL | $11.99 | Brand_Y_White_Wine_750.jpg |
| xxxxx xxxxx 00005 | Brand Y White Wine 1.5L | $19.99 | Brand_Y_White_Wine_1500.jpg |
| ... | ... | ... | ... |

Customer Information Table (262)

| Customer Card No. | Customer Name | Default Packaging Preference |
|---|---|---|
| 1234512 | Mr. Joe Smith | Recyclable paper bags |
| ... | ... | ... |

Packaging Preferences Table (264)

| Customer Card No. | UPC | Total Quantity Including Product | Packaging Preference |
|---|---|---|---|
| 1234512 | xxxxx xxxxx 00004 | less than 5 | Recyclable paper bags & recyclable plastic bag |
| 1234512 | xxxxx xxxxx 00004 | 5 or more | Box Size "A" |
| 1234512 | xxxxx xxxxx 00005 | less than 4 | Recyclable paper bags & recyclable plastic bag |
| 1234512 | xxxxx xxxxx 00005 | 4 or more | Box Size "B" |
| ... | ... | | ... |

Packaging Types Table (266)

| Packaging Type | Image |
|---|---|
| Recyclable paper bag | Recyclable_paper_bag.jpg |
| Recyclable plastic bag | Recyclable_plastic_bag.jpg |
| Recyclable paper bag & Recyclable plastic bag | Recyclable_paper_and_plastic_bags.jpg |
| Box Size "A" | Box_Size_A.jpg |
| Box Size "B" | Box_Size_B.jpg |
| ... | ... |

FIG. 2D

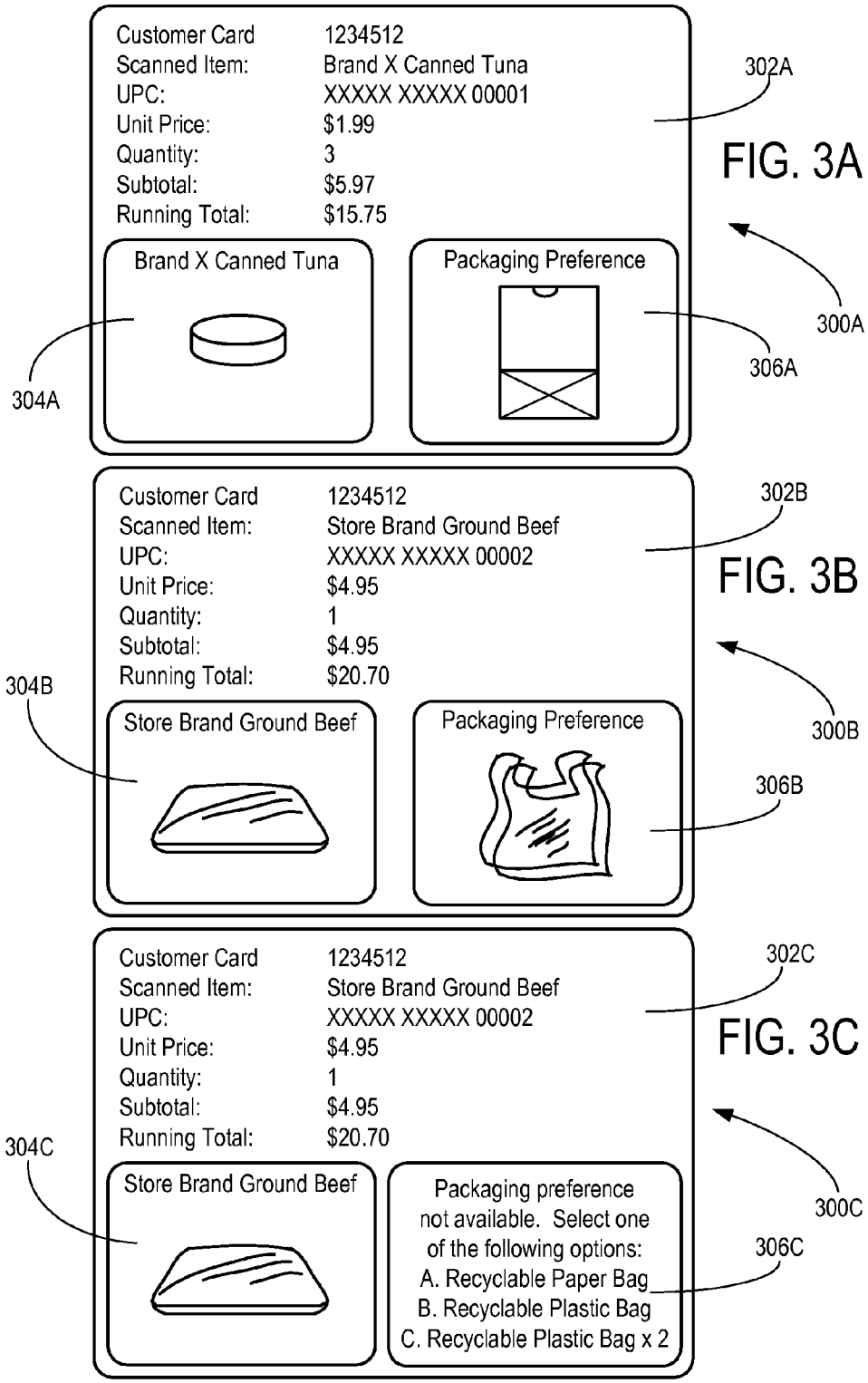

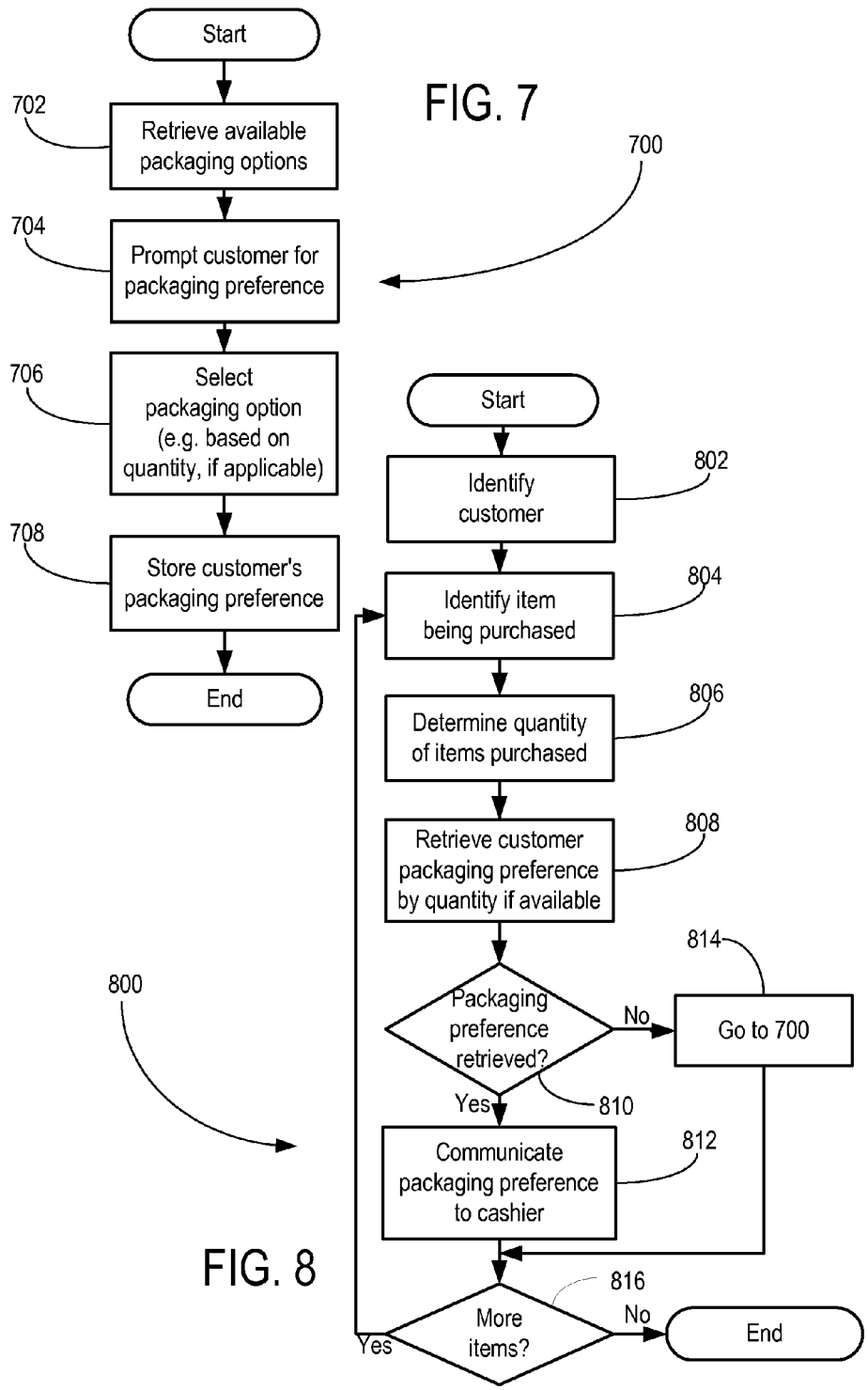

SYSTEM AND METHOD FOR DETERMINING PACKAGING PREFERENCE

CROSS-REFERENCE TO RELATED APPLICATIONS

This application is a continuation of U.S. patent application Ser. No. 11/490,412 filed on Jul. 20, 2006 now U.S. Pat. No. 7,407,089 and entitled SYSTEM AND METHOD FOR DETERMINING PACKAGING PREFERENCE which in turn claims priority from Canadian Patent Application Serial No. 2,517,060 filed on Aug. 24, 2005 and entitled SYSTEM AND METHOD FOR DETERMINING PACKAGING PREFERENCE.

FIELD OF THE INVENTION

The present invention relates to a system and method for determining packaging preference.

BACKGROUND OF THE INVENTION

In retail locations such as grocery stores, liquor & wine stores, hardware and department stores, customers typically must pass through a cashier station to pay for items they wish to purchase. At the cashier station, the cashier may package the purchased items for the customer so that the customer can conveniently carry the items out of the store. If different packaging options are offered, the customer may have a preference as to the type of packaging desired. However, at conventional retail locations, the customer is likely to be asked for their packaging preference each time the customer passes through a cashier station, resulting in unnecessary inconvenience for both the customer and the cashier.

What is needed is a more flexible system and method for determining packaging preference that overcomes some of these limitations.

SUMMARY OF THE INVENTION

The present invention relates to a system and method for determining packaging preference.

According to an aspect of the invention, there is provided a method of determining a customer's packaging preference, comprising the steps of identifying the customer using a customer identifier, and retrieving available packaging preference information using the customer identifier for the identified customer.

According to another aspect of the invention there is provided a system for determining a customer's packaging preference, comprising a customer identifier for identifying the customer and means for retrieving available packaging preference information for the identified customer using the customer identifier.

According to yet another aspect of the invention, there is provided a data processor readable medium storing data processor code that, when loaded into a data processing device, adapts the device to determine a customer's packaging preference, the data processor readable medium including code for identifying the customer using a customer identifier and code for retrieving available packaging preference information using the customer identifier for the identified customer.

These and other aspects of the invention will become apparent to one skilled in the art from the following more detailed description of exemplary embodiments and the drawings.

BRIEF DESCRIPTION OF THE DRAWINGS

FIG. 2B shows an illustrative example of a customer card.

FIG. 2C shows illustrative database tables containing data that may be processed at the cashier station of FIG. 2A.

FIG. 2D shows further illustrative database tables containing data that may be processed at the casher station of FIG. 2A.

FIGS. 3A, FIG. 3B and FIG. 3C show illustrative screen shots that may appear on the point-of-sale (POS) terminal at the cashier station of FIG. 2A.

FIG. 7 shows a flowchart of an illustrative method for selecting a packaging preference, and for storing the selected packaging preference information for subsequent retrieval.

FIG. 8 shows a flowchart of an illustrative method for identifying a product, determining the quantity of items purchased, and for retrieving a customer's packaging preference information based on the quantity of items purchased.

DETAILED DESCRIPTION OF THE PREFERRED EMBODIMENT

As noted above, the present invention relates to a method and system for determining packaging preference.

As will be explained below, the invention may be embodied in various physical configurations that may include data processing systems, networks, peripheral devices, software and firmware. The particular configurations shown by way of example in this specification are not meant to be limiting.

Figure 1:
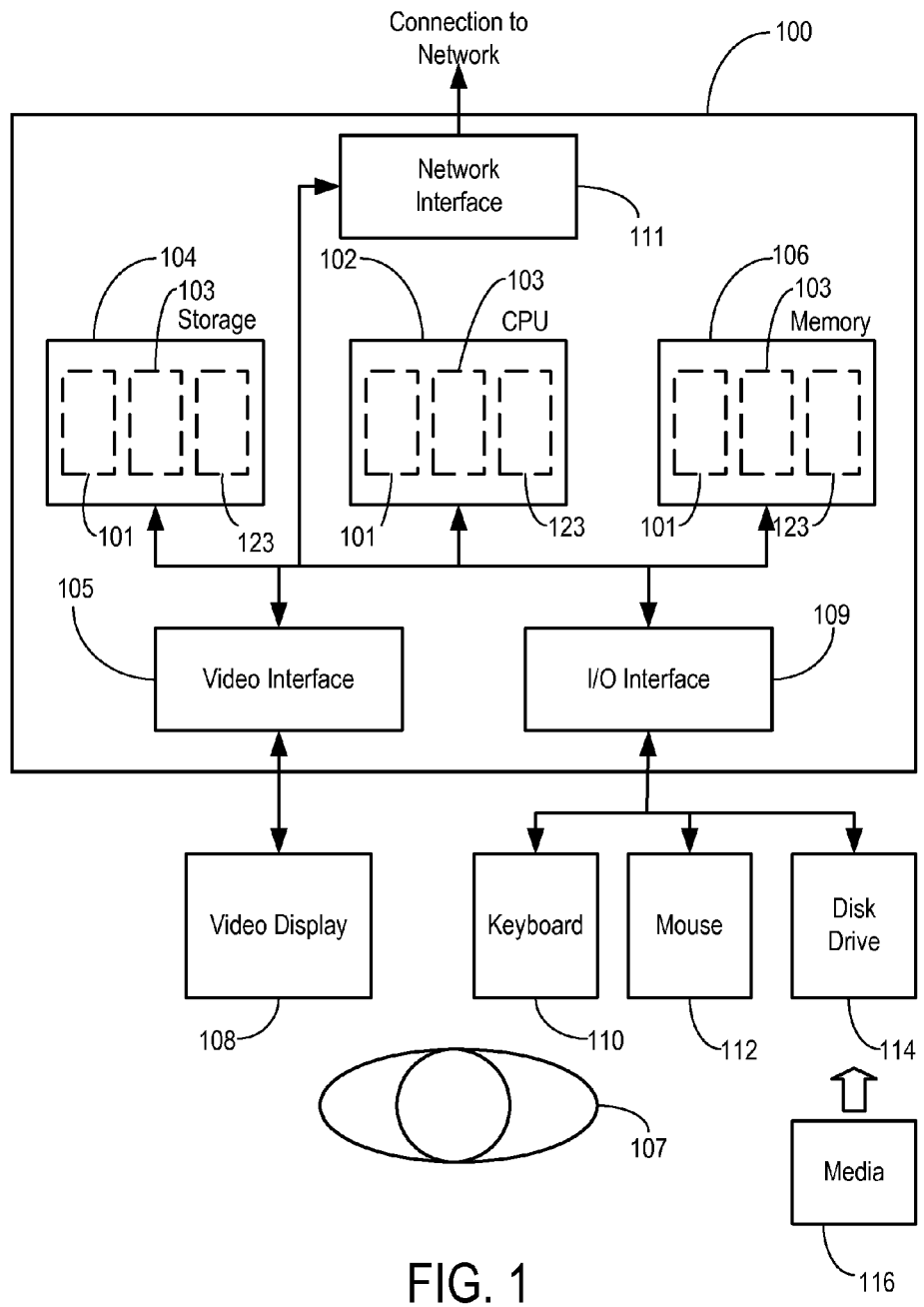
FIG. 1 shows a generic data processing system that may provide a suitable operating environment.

By way of example, FIG. 1 shows a generic data processing system 100 that includes a central processing unit (CPU) 102 connected to a storage unit 104 and to a random access memory 106. CPU 102 may process an operating system 101, application programs 103, and data 123. Operating system 101, application programs 103, and data 123 may be stored in storage unit 104 and loaded into memory 106, as may be required. An operator 107 may interact with data processing system 100 using a video display 108 connected by a video interface 105, and various input/output devices such as a keyboard 110, a mouse 112, and a disk drive 114 connected by an I/O interface 109. In known manner, mouse 112 may be configured to control movement of a cursor in video display 108, and to operate various graphic user interface (GUI) controls appearing in the video display with a mouse button. Alternatively, video display 108 may include a touch sensitive screen for selection of options by touching various predetermined areas of the touch sensitive screen. A disk drive 114 may be configured to accept data processing system readable media 116. Data processing system 100 may form part of a network via a network interface 111, allowing the data processing system to communicate with other suitably configured data processing systems.

Figure 2A:
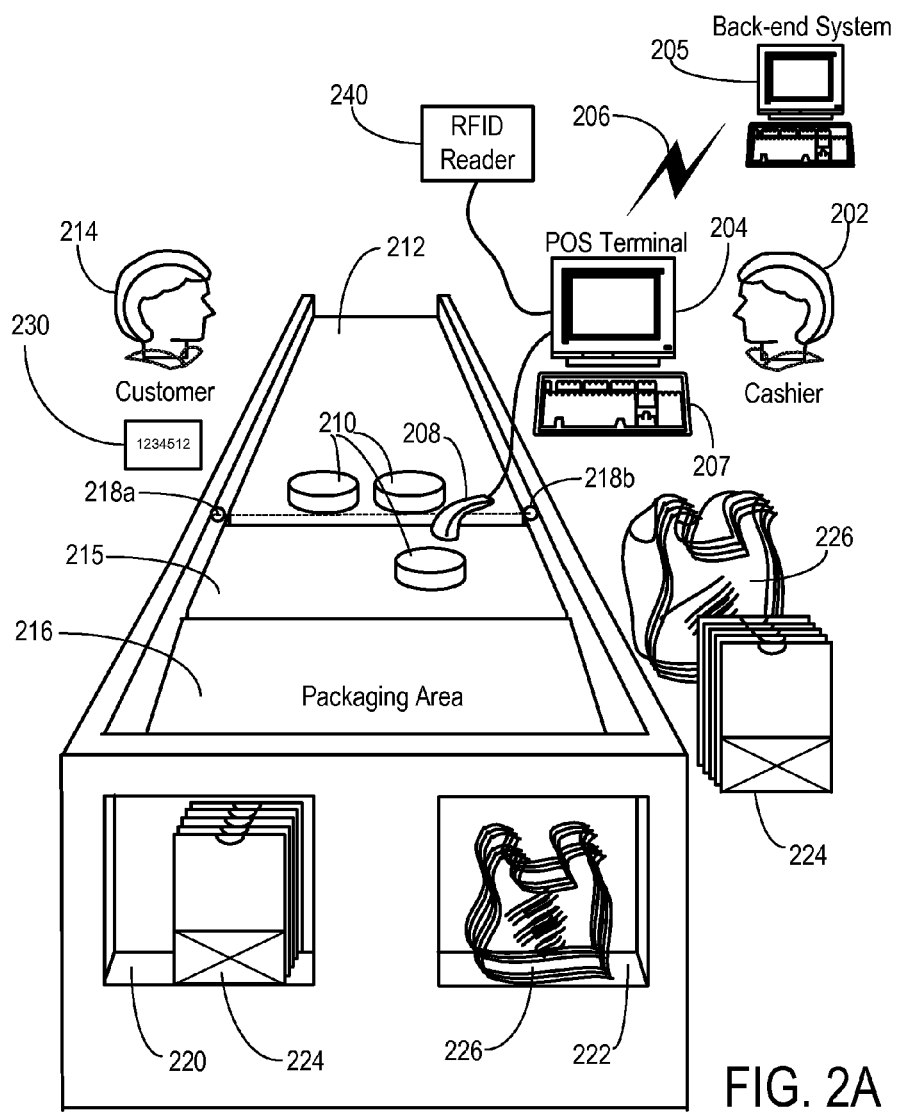
FIG. 2A shows an illustrative example of a cashier station including a system for determining a customer's packaging preference.

FIG. 2A shows an illustrative example of a cashier station 200. Cashier station 200 may include a data processing system configured as a POS terminal 204. In a networked configuration, POS terminal 204 may communicate with a back-end system 205 via a suitably configured network 206. Each POS terminal 204 and back-end system 205 may be configured similarly to the illustrative data processing system 100 of FIG. 1, with operating system 101, application programs 103, and data 123. For example, one application program residing on POS terminal 204 and/or back-end system 205 may be a relational database management system (DBMS) suitably designed to store information for products, customers, and packaging preferences. This is described in greater detail below.

As shown in FIG. 2A, a cashier 202 may operate POS terminal 204 which may be operatively connected to an input device 207 (e.g. a keyboard) and a scanner 208. Scanner 208 may be configured to read, for example, universal product code (UPC) labels on items 210 placed on a conveyor 212 for checkout by a customer 214.

Cashier station 200 may include a scanning area 215 for scanning items 210 using scanner 208. Cashier station 200 may also include a packaging area 216 for packaging items 210 that have been scanned. In known manner, in order to control the flow of items on conveyor 212 into scanning area 215, a sensor 218a, 218b placed near the end of conveyor 212 but before the scanning area 215 may be configured to detect item 210. Upon detection of item 210, sensor 218a, 218b may be configured to immediately stop conveyor 212.

Packaging area 216 may include storage areas 220 and 222 for storing different types of packaging. For example, storage areas 220 and 222 may store recyclable paper bags 224 and recyclable plastic bags 226, respectively. These different packaging options may also be made available in the proximity of cashier 202 to package items 210 in packaging area 216.

Customer 214 may carry a customer identifier, such as a customer card 230 as shown in greater detail in FIG. 2B. Customer card 230 may include a customer identification number 232 printed on the customer card. Customer identification number 232 may also be stored in a magnetic strip 234 on customer card 230 to be read by a magnetic reader (not shown, but which may be integrated, for example, into input device 207). Alternatively, customer card 230 may include a bar code 236 that may be read by scanner 208, or a passive radio frequency identification (RFID) tag 238 that may be recognized when brought in close proximity to an RFID reader 240 operatively connected to POS terminal 204.

While card 230 has been shown by way of illustration in FIG. 2B, it will be appreciated that, instead of the card, the customer identifier may be any one of a token, a key fob, a chip, or any other suitable type of portable identifier.

Customer card 230 may also provide locations for a visual indicator, such as a sticker 242, to indicate the customer's default packaging preference. Sticker 242 may comprise, for example, a graphic representation of the type of packaging preferred by customer 214. Alternatively, instead of a sticker, a mark or other distinctive graphic design may be printed on customer card 230. With the visual indicator on customer card 230, cashier 202 may receive an immediate indication of the customer's default packaging preference, as customer 214 arrives at cashier station 200 and presents the customer card to checkout items 210.

In an embodiment, rather than simply having a single default packaging preference (e.g. as may be indicated by sticker 242 on customer card 230), customer 214 may have packaging preference information specific to the type of item 210 being purchased. This preference may be stored, for example, in database 123 (see FIG. 1) managed application program 103, such as a DBMS program, running on POS terminal 204 and/or a back-end system 205 accessible via network 206.

By way of example, FIG. 2C shows a number of tables that may be found in database 123, including a "Products Table" 250, a "Customer Information Table" 252, a "Packaging Preferences Table" 254, and a "Packaging Types Table" 256. Products Table 250 may store product related data including a UPC, a description of the product, unit price, and optionally a link to a graphic or image of the product. Customer Information Table 252 may store customer related data including a customer card number, a customer name, and a default packaging preference (e.g. corresponding to the sticker 242). Packaging Preference Table 254 may store data relating to packaging preferences of a particular customer for a particular product (e.g. as identified by the UPC field). Packaging Preferences Table 254 may be linkable to a Packaging Types Table 256 to retrieve a graphic or image of the packaging type for display. Examples of results of a database query on these tables is shown in FIGS. 3A-3C and described hereinbelow.

As a further example, FIG. 2D shows a "Products Table" 260, a "Customer Information Table" 262, a "Packaging Preferences Table" 264, and a "Packaging Types Table" 266. These tables may hold data similar to the data stored in the tables shown in FIG. 2C, except that Packaging Preferences Table 264 may further include alternative packaging preferences as determined by the quantity of items (e.g. a running total of items being checked out). Examples of the results of a database query on these tables is shown in FIGS. 3D-3E and described hereinbelow.

By way of example, FIG. 3A shows an illustrative screen shot 300A of results of a database query as may appear on POS terminal 204 at cashier station 200 of FIG. 2A. As shown, screen shot 300A includes details of customer card 230 as read or scanned at the beginning of a checkout transaction at cashier station 200. In this illustrative example, as shown on screen 302A, customer 214 with a customer card no. "1234512" is checking out an item "Brand X Canned Tuna" with a UPC label and a unit price of $1.99. The quantity of items being checked out is three, and the subtotal and running total are also shown on screen 302A.

For each item being checked out, screen 302A may optionally display a first window 304A with a graphic representation of the identified item, e.g. as retrieved from the database tables illustrated in FIG. 2C. Also shown in this example is a second window 306A with a graphic representation or image of the packing preference of customer 214 for the particular item shown in first window 304A. This packaging preference information associated with an item may be retrieved, for example, using a suitable query on Packaging Preferences Table 254 storing the information. In this illustrative example, the packaging preference is shown to be a recyclable paper bag 224, and this information may be graphically communicated to cashier 202 for immediate understanding.

While graphic communication of a customer's packaging preference is preferred (e.g. a graphic representation or image of the customer's packaging preference displayed at POS terminal 204), the communication of packaging preference may also be alphanumeric, or audible. For example, the packaging preference may be indicated in text on POS terminal 204. The packaging preference may also be indicated by playing a pre-recorded voice message, or using text-to-speech synthesis, or using a unique tone for each type of packaging available. Packaging preference may also be indicated by visually directing the cashier and/or customer to the proper storage areas 220 and 222 for storing the different types of packaging (e.g. by the use of a flashing light signal or the like).

Continuing with this example, FIG. 3B shows another illustrative screen shot 300B as may appear on POS terminal 204 as the next item is being checked out. As shown on screen 302B, for the same customer 214 with customer card no. "1234512", the next scanned item is "Store Brand Ground Beef" with a UPC label and a weighed price of $4.95 (e.g. as previously weighed at the meat & deli counter). The quantity of the item is one, and the subtotal and running total are shown on screen 302B.

Screen 302B may again display a first window 304B with a graphic representation of the identified item, and a second window 306B with a graphic representation of the type of packaging preferred by customer 214 for that particular item. As shown in second window 306B, the fact that customer 214 prefers the item shown in the first window 304B to be double-bagged in recyclable plastic bags is graphically communicated to the cashier for immediate recognition. Again, if the packaging preference information has been previously stored, it is unnecessary for cashier 202 to ask for this information, or for customer 214 to supply this information each time the item is purchased at the store.

Packaging preference information may not be previously stored for every item that a customer 214 checks out. For example, as shown in FIG. 3C, if customer 214 is checking out an item shown in first window 304C for the first time, and no packaging preference information is retrieved in second window 306C, cashier 202 may be instructed to prompt customer 214 to select one of the available packaging options. Once selected (e.g. by inputting the selection via input device 207), the packaging preference information may be stored in database 123 (e.g. as shown by way of illustration in the tables in FIGS. 2C and 2D) on POS terminal 204 or on back-end system 205.

In an alternative embodiment, rather than keeping track of a customer's packaging preference for each particular item, the customer's packaging preference for a particular class of items may be stored. For example, customer 214 may prefer that all fruits and vegetables be stored in recyclable paper bags 224, and that all frozen products, meats and poultry be stored in recyclable plastic bags 226.

In another embodiment, only particular items specified by customer 214 may be associated with a particular packaging preference, with the remainder of items being associated with a default preference (e.g. as may be shown by a sticker, mark or design on customer card 230).

Figure 4A:
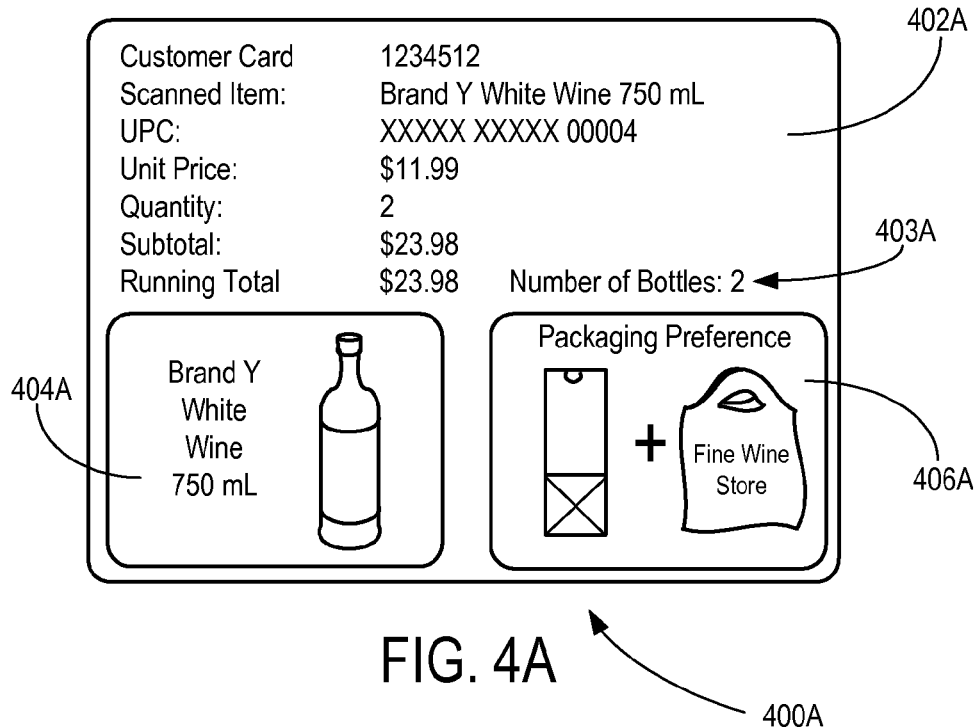
FIG. 4A and FIG. 4B show further illustrative screen shots that may appear on the POS terminal at the cashier station of FIG. 2A.

In yet another embodiment, the customer's packaging preference may be determined based on the quantity of items being checked out. For example, as shown in the illustrative screen shot 400A of FIG. 4A, customer 214 with customer card no. "1234512" is checking out two 750 mL bottles of "Brand Y White Wine". The UPC, unit price, and quantity of items being purchased are shown on screen 402A. Screen 402A may also display a total count 403A of the number of bottles being purchased.

A first window 404A on screen 402A may provide a graphic illustration of Brand Y White Wine. A second window 406A may provide a graphic illustration of the type of packaging preferred by customer 214 for a quantity of two bottles of wine. In this example, the graphic appearing in second window 406A indicates that customer 214 prefers the use of a recyclable paper bag for one of the bottles plus a larger recyclable plastic bag for the two bottles of wine.

Figure 4B:
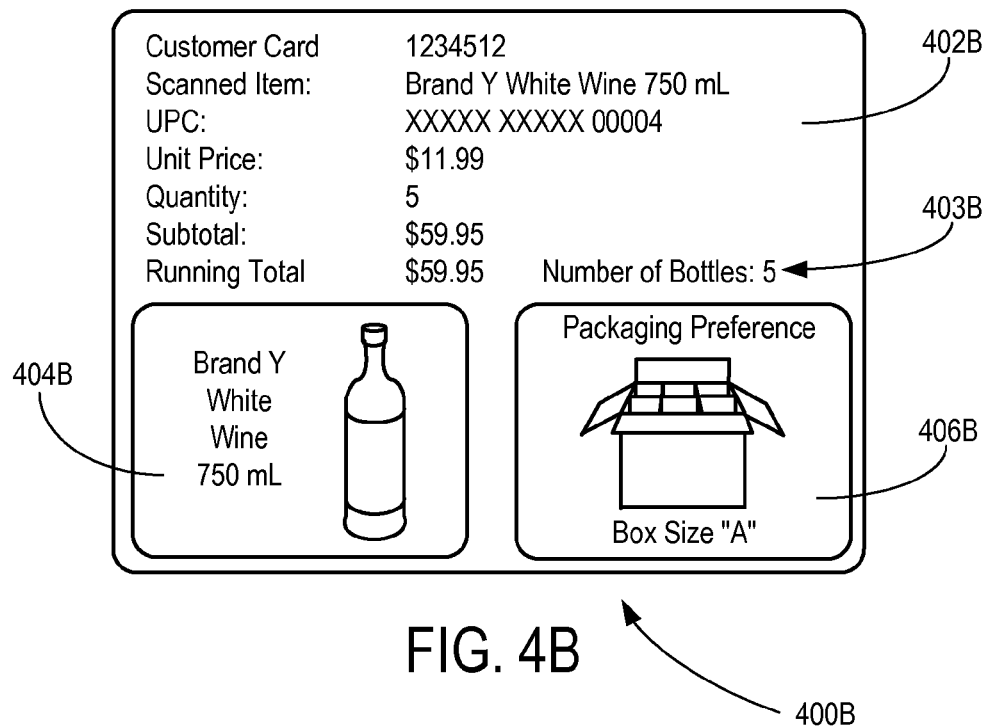

As shown on screen shot 400B in FIG. 4B, for larger quantities of wine, the customer may have previously indicated a preference for another type of packaging. For example, as shown on screen 402B, customer 214 with customer card no. "1234512" may be purchasing a quantity of five 750 mL bottles of Brand Y White Wine as shown in a first window 404B. A total count 403B of the number of bottles may also be displayed on screen 402B. For this particular quantity of bottles, a second window 406B may indicate that customer 214 would prefer a size "A" box capable of holding up to six bottles of wine. Again, the type of packaging preferred by customer 214 is communicated to cashier 202 without the need for the cashier to make an inquiry.

In yet another embodiment, both the type of item and the quantity of item may determine the customer's packaging preference. For example, in the illustrative example shown in FIG. 4B, if customer 214 was instead purchasing a combination of 1.5 L bottles and 750 mL bottles, second window 406B may indicate that customer 214 requires a larger size "B" box (not shown) that is capable of holding both 1.5 L and 750 mL bottles. If customer 214 has always shown a packaging preference for boxes, but had never previously purchased 1.5 L bottles, similar types of available packaging may be recommended to customer 214 in second window 406B. This may be accomplished, for example, by grouping the similar types of packaging together so that a similar alternative may be presented for selection.

Figure 5:
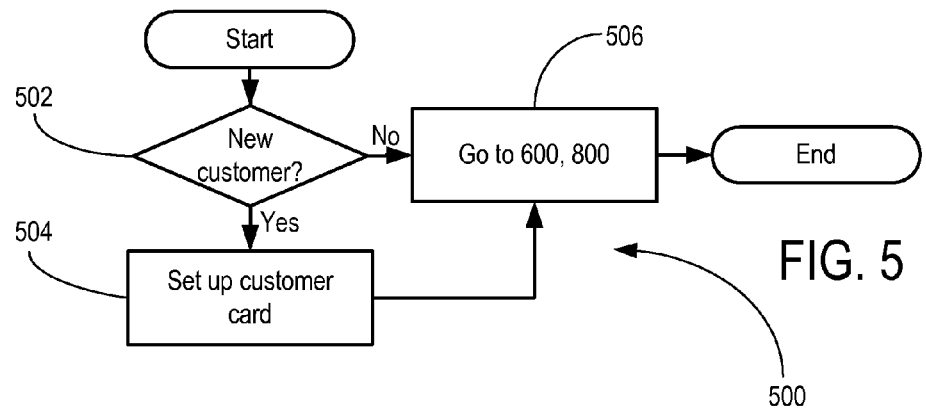
FIG. 5 shows a flowchart of an illustrative method for setting up a customer card.

Now referring to FIG. 5, a flowchart of an illustrative method 500 is shown for setting up a new customer card. At decision block 502, method 500 determines if the customer being served at cashier station 200 is a new customer. If yes, method 500 may proceed to block 504. If no, method 500 may proceed to block 506, and then to one of methods 600 or 800, as described herein below.

At block 504, cashier 202 may issue and activate a new customer card 230. This activation process may include configuring the DBMS application program running on POS terminal 204 and/or on back-end system 205 to begin storing customer packaging preferences for the customer associated with newly issued customer card 230. Method 500 may then proceed to block 506.

Figure 6:
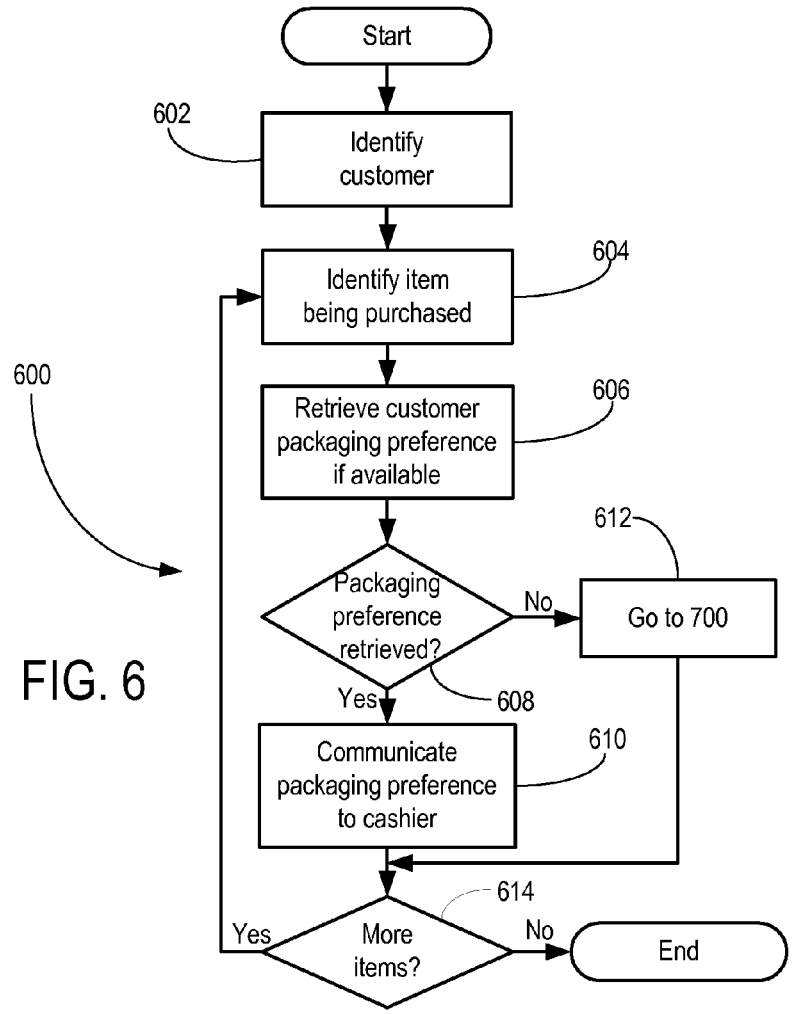
FIG. 6 shows a flowchart of an illustrative method for identifying an item being purchased, and for retrieving a customer's packaging preference information for the identified item.

Now referring to FIG. 6, a method 600 for retrieving a customer's packaging preferences for each identified item is shown. At block 602, method 600 identifies the customer via customer card 230. This may be done by typing in customer card number 232 via input device 207, reading magnetic strip 234, scanning bar code 236, or reading RFID tag 238 affixed to or embedded in card 230.

Once the customer has been identified at block 602, method 600 may proceed to block 604, where each item being purchased is identified. For example, hand-held scanner 208 may be used to identify each item 210 having a UPC label. Alternatively, if scanning a UPC label on an item is problematic, or if a UPC label is not provided, either a numeric UPC code or item code may be typed into POS terminal 204 via input device 207. Alternatively, items having an RFID tag may be identified using RFID reader 240.

Method 600 may then proceed to block 606, where a database query may be made using the DBMS application program to retrieve a packaging preference for the item identified at block 604 if the packaging preference information is available for retrieval. If, at decision block 608, a customer's packaging preference is retrieved, the packaging preference may be communicated to a cashier at block 610. If no, method 600 may proceed from decision block 608 to block 612 and to method 700. A portion of method 600 may be repeated in a loop until all items have been checked out, as determined at decision block 614. Method 600 may then end.

FIG. 7 shows a flowchart of an illustrative method for prompting a customer's packaging preference if it is not retrievable from database 123. At block 702, method 700 retrieves the available packaging options offered by the store. At block 704, the cashier may be instructed to prompt the customer to provide a packaging preference. For example, as illustrated in FIG. 3C, for the item currently shown in first window 304C, the cashier may be prompted to select one of a recyclable paper bag, a recyclable plastic bag, or doubled recyclable plastic bags. Once a packaging option is selected at block 706 (e.g. by a cashier on behalf of the customer), this preference may be stored into database 123 at block 708. Method 700 may then end.

Referring now to FIG. 8, shown is an alternative method 800 where the type of items purchased and the quantity of items purchased may be used as an input for determining packaging preference. As shown, method 800 proceeds substantially analogously to method 600 of FIG. 6, except that the quantity of items purchased is also determined. Method 800 begins at block 802 where the identity of a customer is identified by the customer card. At block 804, each item being purchased is identified. At block 806, the quantity of items may be determined. A total count of the quantity of items may be tracked, as shown earlier by way of example in FIGS. 4A and 4B.

From block 806, method 800 proceeds to block 808, where a customer's packaging preference by quantity is retrieved if available (e.g. from database 123 stored on POS terminal 204 or back-end system 205). If retrieval at block 808 is successful, as determined at decision block 810, method 800 proceeds to block 812 where the packaging preference by quantity is communicated to the cashier. If no, method 800 proceeds to block 814, where method 800 proceeds back to method 700, in order to prompt a packaging preference from the customer.

If more items are to be scanned, as determined at decision block 816, method 800 may return to block 804 and continue. It will be appreciated that, as the number of items purchased increases as determined at block 806, the customer's packaging preference may change, as earlier illustrated in the examples shown in FIGS. 4A and 4B.

While illustrative embodiments of the invention have been described above, it will be appreciated by those skilled in the art that variations and modifications may be made. Thus, the scope of the invention is defined in the following claims.

What is claimed is:

1. A system for determining a customer's packaging preference in a conventional point-of-sale retail location, wherein the point-of-sale retail location includes a person who performs the packaging of items purchased in the point-of-sale retail location for the customer, comprising:
   a customer identifier for identifying the customer; and
   means for retrieving available container packaging preference information for the purchased items for the identified customer using the customer identifier.

2. The system of claim 1, further comprising an indicator provided on the customer identifier to indicate container packaging preference information to the person who performs the packaging in the point-of-sale retail location for the identified customer.

3. The system of claim 2, wherein the indicator is a graphic design.

4. The system of claim 2, wherein the indicator is a sticker affixable to the customer identifier.

5. The system of claim 1, further comprising communications means for communicating the retrieved container packaging preference information to the person who performs the packaging for the customer in the point-of-sale retail location.

6. The system of claim 5, wherein the communications means comprises a display for graphically displaying the container packaging preference information to the person who performs the packaging in the point-of-sale retail location.

7. The system of claim 5, wherein the communications means comprises one of an auditory signal means and a visual alert signal means associated with the packaging preference information.

8. The system of claim 1, further comprising storage means for storing in a non-volatile memory the packaging preference information for the identified customer.

9. The system of claim 1, further comprising identification means for identifying a particular item to be packaged, and retrieval means for retrieving available packaging preference information specific to the particular item to be packaged.

10. The system of claim 1, further comprising count means for determining a quantity of items to be packaged, and retrieval means for retrieving available packaging preference information specific to the quantity of items to be packaged.

11. The system of claim 1, further comprising count means for determining a quantity of the particular items to be packaged, and retrieval means for retrieving available packaging preference information specific to the particular items including the quantity of the particular items to be packaged.

12. A data processor readable medium storing data processor code that, when loaded into a data processing device, adapts the device to determine a customer's packaging preference in a conventional point-of-sale retail location wherein the point-of-sale retail location includes a person who performs the packaging of items purchased in the point-of-sale retail location for the customer, the data processor readable medium including:
   code for identifying the customer using a customer identifier; and
   code for retrieving available container packaging preference information for the purchased items using the customer identifier for the identified customer.

13. The data processor readable medium of claim 12, further including code for communicating the retrieved container packaging preference information to the person who performs the packaging in the point-of-sale retail location.

14. The data processor readable medium of claim 12, further including code for graphically communicating the retrieved container packaging preference information to the person who performs the packaging in the point-of-sale retail location.

15. The data processor readable medium of claim 12, further including code for identifying a particular item to be packaged, and code for retrieving available packaging preference information specific to the particular item to be packaged.

16. The data processor readable medium of claim 12, further including code for determining a quantity of items to be packaged, and code for retrieving available packaging preference information specific to the quantity of items to be packaged.

17. The data processor readable medium of claim 12, further including code for determining a quantity of the particular items to be packaged, and code for retrieving available packaging preference information specific to the particular items including the quantity of the particular items to be packaged.

* * * * *